PULSE DELAYER INVERTER AND STRETCHER

Filed Feb. 26, 1960

INVENTOR.
ALBERT C. FAUST
BY
H. H. Losche
ATTORNEYS

1

3,075,148
PULSE DELAYER INVERTER AND STRETCHER
Albert C. Faust, Riverton, N.J., assignor, by mesne assignments, to the United States of America as represented by the Secretary of the Navy
Filed Feb. 26, 1960, Ser. No. 11,385
2 Claims. (Cl. 328—58)

This invention relates to pulse stretching means and more particularly to a circuit for producing a delayed inverted and stretched signal in response to a relatively short duration input pulse.

Prior art circuits have been developed to produce delay inversion or stretching of pulses but there are relatively few which produce all of these functions in a relatively simple circuit. The present invention produces pulses in the output in response to input pulses. These output pulses are delayed for a period of time equal to the duration of the input pulse. The output pulses are proportional to the input pulses and are inverted with respect to the input pulses and are stretched to have a duration significantly longer than that of the input pulses. This invention utilizes a cathode follower having an input from a pulse such as the gated video output of a radar system. The cathode of the cathode follower is coupled through a capacitor which is charged through a diode during the presence of an input pulse on the grid of the cathode follower. The common junction between the charging capacitor and the diode may be coupled to the grid of a degenerative amplifier stage to drive a box car detector in an AGC application. A resistor is coupled across the diode and provides a time constant determining the duration of the stretched output pulse appearing at the grid of the amplifier stage. The stretched output pulse has an amplitude which is proportional to the input pulse, is inverted with respect to the input pulse, and is produced beginning when the input pulse disappears from the grid of the cathode follower. It is accordingly an object of the present invention to provide a circuit which is capable of producing, in response to an input pulse, an output signal which is inverted with respect to the input pulse and is delayed with respect thereto and has a significantly longer duration than that of the input pulse. Other objects and advantages of the invention will become more fully apparent from the following description of the subject of the drawings which illustrate a preferred embodiment wherein:

Figure 1:
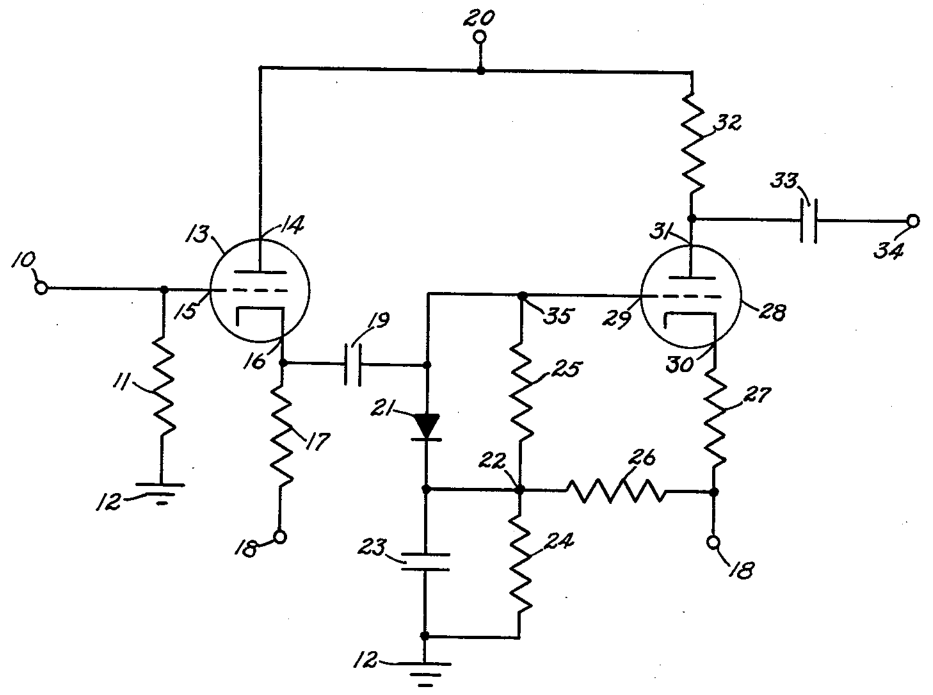
FIGURE 1 shows a preferred embodiment of the circuit of this invention.

Referring particularly to FIGURE 1, which shows a preferred embodiment of the invention, there is shown a cathode follower triode 13 having the anode 14 connected to a source of positive potential at terminal 20. The cathode follower also has a cathode 16 coupled through a resistance 17 to a source of negative potential at terminal 18. There is a terminal 10 connected to the grid of the cathode follower and through a grid leak resistance 11 to a source of constant reference potential (ground) at 12. Storage capacitor 19 is coupled to cathode 16 of triode 13 and also through diode 21 and the parallel combination of resistance 24 and capacitor 23 to ground 12. Resistance 25 is connected between capacitor 19 and the junction 22 of the voltage divider comprised of resistance 26 connected to the source of negative potential at terminal 18 and resistance 24 connected across capacitor 23 to ground 12. Diode 21 is connected so that its low resistance to a positive current is in the direction from capacitor 19 toward junction 22. Triode 28 has grid input from capacitor 19 at junction 35. The anode of triode 28 is connected through the resistance 32 to the source of positive potential at terminal 20. The cathode of triode 28 is connected through resistance 27 to the source of negative potential at terminal 18. The output from triode 28 is taken through capacitor 33 from the anode 31 to the terminal 34.

2

*Operation*

Figure 2:
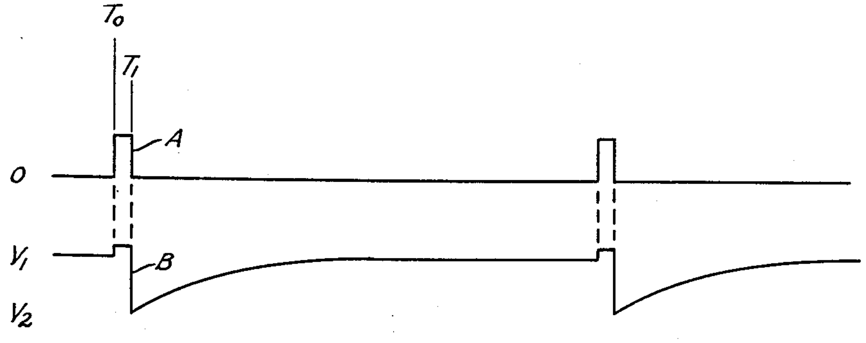
FIGURE 2 shows a typical input and output waveform.

Referring to FIGURE 2, a typical input to the circuit of this invention is represented by the waveform designated A. The output of the circuit at junction 35 is represented in the FIGURE 2 by waveform B. Upon arrival of the leading edge of the pulse input to terminal 10 of FIGURE 1, the cathode of cathode follower triode 13 goes approximately as high as the input pulse. This charges capacitor 19 through diode 21. Due to the presence of some forward resistance in the charging circuit of capacitor 19, there is manifested at junction 35 a slight rise in potential. This is indicated on waveform B of FIGURE 2 at time $T_0$. Upon arrival of the trailing edge of the pulse input to terminal 10, which is shown in FIGURE 2 on waveform A at time $T_1$, a charge has been obtained on capacitor 19. As the potential at terminal 10 drops to zero at time $T_1$, the potential at junction 35 drops as shown in waveform B of FIGURE 2. As capacitor 19 recharges through resistances 24 and 25, the voltage at the junction 35 and likewise on grid 29 rises as shown on waveform B of FIGURE 2 to the right of the line designated time $T_1$. Upon arrival of the next input pulse at terminal 10 and grid 15 of cathode follower 13, the cycle is repeated.

For illustrative purposes only, it may be said that the source of positive potential at terminal 20 can be 165 volts, the source of negative potential at terminal 18 can be minus 150 volts, the potential at junction 22 may be minus 143 volts. With these values for the supply and the junction voltage at 22, the voltage at $V_1$ on waveform B in FIGURE 2 of the drawing would be minus 143 volts. For an input voltage at terminal 10 of plus 10 volts the voltage at $V_2$ on waveform B in FIGURE 2 would then be minus 153 volts. While the output of the triode 28 may be used for a variety of purposes a typical application would be to drive a box car detector.

This description has referred to a preferred embodiment of the invention but it should be understood that various modifications may be resorted to by those skilled in the art which would nevertheless be within the scope of the present invention which is defined by the appended claims.

What is claimed is:

1. A pulse stretching circuit comprising: input means for signals; cathode follower means coupled to said input means and to a source of positive and negative voltage supply; first storage means coupled to an output of said cathode follower means; a point of constant reference potential; a voltage divider having a first branch coupled to said point of constant reference potential and a second branch coupled to said source of negative supply, said first and second branches having a common junction; unidirectional means coupled between said first storage means and said junction oriented with its positive current conducting direction in the direction from said first storage means towards said junction; a second storage means coupled across said first voltage divider branch; resistance means coupled across said diode; and output means coupled to said first storage means whereby positive pulses applied to said input produce a stretched signal on the output proportional to the magnitude of each input pulse and delayed for a time interval equal to the width of each input pulse.

2. A pulse stretching circuit as set forth in claim 1 wherein said output means comprises a degenerative amplifier stage.

References Cited in the file of this patent

UNITED STATES PATENTS

| | | |
|---|---|---|
| 2,227,056 | Blumlein et al. | Dec. 31, 1940 |
| 2,786,902 | Walter | Mar. 26, 1957 |
| 2,929,928 | Hodder | Mar. 22, 1960 |

OTHER REFERENCES

Easton, A., "Pulse Response of Diode Voltmeters," Electronics, January 1946 (page 149 relied on).